United States Patent
Kodeswaran et al.

(10) Patent No.: US 9,307,451 B1
(45) Date of Patent: Apr. 5, 2016

(54) DYNAMIC ENTERPRISE BOUNDARY DETERMINATION FOR EXTERNAL MOBILE DEVICES

(71) Applicant: International Business Machines Corporation, Armonk, NY (US)

(72) Inventors: Palanivel Kodeswaran, Bangalore (IN); Sougata Mukherjea, New Delhi (IN); Prasad G. Naldurg, Bangalore (IN); Venkatraman Ramakrishna, New Delhi (IN); Arvind Seshadri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/558,388

(22) Filed: Dec. 2, 2014

(51) Int. Cl.
| | |
|---|---|
| *H04M 3/42* | (2006.01) |
| *H04W 28/20* | (2009.01) |
| *H04W 12/08* | (2009.01) |
| *H04W 8/00* | (2009.01) |
| *H04W 48/02* | (2009.01) |
| *H04W 8/18* | (2009.01) |

(52) U.S. Cl.
CPC .............. *H04W 28/20* (2013.01); *H04W 8/005* (2013.01); *H04W 8/18* (2013.01); *H04W 12/08* (2013.01); *H04W 48/02* (2013.01)

(58) Field of Classification Search
CPC ..... H04W 28/20; H04W 12/08; H04W 8/005; H04W 8/18; H04W 48/02
USPC ................ 455/414.1, 414.2, 424, 434, 435.1, 455/435.2; 370/338, 465
See application file for complete search history.

(56) References Cited

U.S. PATENT DOCUMENTS

| | | | | |
|---|---|---|---|---|
| 8,325,922 | B1 * | 12/2012 | Sun ........................ | H04W 12/04 380/258 |
| 2006/0177063 | A1 * | 8/2006 | Conway .................. | H04L 63/02 380/270 |
| 2010/0045424 | A1 * | 2/2010 | Kawakita ........... | G07C 9/00158 340/5.2 |
| 2011/0209196 | A1 * | 8/2011 | Kennedy ................. | G06F 21/55 726/1 |
| 2011/0239276 | A1 * | 9/2011 | Garcia Garcia ....... | H04L 63/102 726/4 |
| 2014/0007183 | A1 | 1/2014 | Qureshi et al. | |
| 2014/0095724 | A1 | 4/2014 | Yoakum et al. | |

OTHER PUBLICATIONS

White Paper, "Cisco Network Admission Control (NAC) Executive Overview", Cisco Systems, Inc., 2009, 6 pages, Available at: http://www.cisco.com/c/en/us/solutions/collateral/enterprise-networks/network-admission-control/net_implementation_white_paper0900aecd80557152.html, Accessed on Oct. 20, 2014.

(Continued)

*Primary Examiner* — Khai M Nguyen
(74) *Attorney, Agent, or Firm* — Ference & Associates LLC

(57) ABSTRACT

Methods and arrangements for according access of a mobile device to an enterprise network. the presence of a mobile device relative to an enterprise network is detected, the enterprise network including a plurality of defined zones, wherein each zone is associated with a security level and with one or more resources. An agent of the mobile device is negotiated with to accord access to at least one of the defined zones. The negotiating includes: assessing at least one security constraint relative to the mobile device; and thereupon designating at least one zone to be accessible to the mobile device. Other variants and embodiments are broadly contemplated herein.

13 Claims, 4 Drawing Sheets

(56) References Cited

OTHER PUBLICATIONS

Mobileiron, Product website available at: http://www.mobileiron.com/en, 4 pages, Accessed on Oct. 20, 2014.

Bluecat Networks, Product website available at: http://www.bluecatnetworks.com/products/bluecat-dns-dhcp-server/security, 1 page, Accessed on Oct. 20, 2014.

IBM Endpoint Manager, Product website available at: http://www-01.ibm.com/software/tivoli/solutions/unified-endpoint-management/whatis.html, 2 pages, Accessed on Oct. 21, 2014.

IBM Fiberlink MAAS360, Available at: http://content.maas360.com/www/MaaStersCenter/content/byodMdmNac.pdf, 30 pages, Accessed on Oct. 21, 2014.

\* cited by examiner

DYNAMIC ENTERPRISE BOUNDARY DETERMINATION FOR EXTERNAL MOBILE DEVICES

BACKGROUND

Generally, it is understood that enterprises control heterogeneous resources and can entail complex security requirements. This ties into the constant interaction of external devices with enterprises, placing demands on access to resources. For instance, employees associated with an enterprise may carry their own personal mobile devices to work, while clients and visitors may bring in mobile devices for business purposes. Such mobile devices can include (but are not necessarily limited to) mobile phones (including smartphones), personal digital assistants and laptop or tablet computers; the term "mobile devices" is also used interchangeably herein with "devices". An enterprise may be defined herein, non-restrictively but interchangeably, as a business, a business concern, a firm, a government agency, a non-profit organization or (generally) a workplace, any or all of which have resources to protect. As broadly understood herein, "resources" can refer to private data, services and/or tangible resources. Tangible resources may include, e.g., hardware such as printers, projectors or other items. Services may include, e.g., web or cloud services. Private data may include, e.g., data such as found in particular files or databases. Any and all of these items—resources including private data, services and/or tangible resources—can be considered to form at least part of an "enterprise network" as broadly understood herein.

Accordingly, it has not always been easy to strike a balance between functionality and security. While enterprises cannot literally shut down in the face of indeterminate threats, external devices accessing enterprise resources may still potentially carry and spread malware, or be in a position to mount insider attacks. For instance, external devices may be in a position to access and leak sensitive enterprise data. Simple "in/out" policies, according a single boundary or access point, may be overly restrictive and inflexible, wherein harmless devices get denied access or are subjected to undue intrusion by enterprises. Other inefficient and unworkable solutions have involved access based purely on identity, or the manual facilitation of access on a case-by-case basis on the part of system administrators.

BRIEF SUMMARY

In summary, one aspect of the invention provides a method of according access of a mobile device to an enterprise network, the method comprising: utilizing at least one processor to execute computer code configured to perform the steps of: detecting the presence of a mobile device relative to an enterprise network; the enterprise network including a plurality of defined zones, wherein each zone is associated with a security level and with one or more resources; and automatically negotiating with an agent of the mobile device to accord access to at least one of the defined zones; the negotiating comprising: assessing at least one security constraint relative to the mobile device; and thereupon designating at least one zone to be accessible to the mobile device.

Another aspect of the invention provides an apparatus for according access of a mobile device to an enterprise network, the apparatus comprising: at least one processor; and a computer readable storage medium having computer readable program code embodied therewith and executable by the at least one processor, the computer readable program code comprising: computer readable program code configured to detect the presence of a mobile device relative to the enterprise network; the enterprise network including a plurality of defined zones, wherein each zone is associated with a security level and with one or more resources; and computer readable program code configured to automatically negotiate with an agent of the mobile device to accord access to at least one of the defined zones, via: assessing at least one security constraint relative to the mobile device; and thereupon designating at least one zone to be accessible to the mobile device.

A further aspect of the invention provides a computer program product for according access of a mobile device to an enterprise network, the computer program product comprising: a computer readable storage medium having computer readable program code embodied therewith, the computer readable program code comprising: computer readable program code configured to define a plurality of zones of an enterprise network, wherein each zone is associated with a security level and with one or more resources; computer readable program code configured to detect the presence of a mobile device relative to the enterprise network; the enterprise network including a plurality of defined zones, wherein each zone is associated with a security level and with one or more resources; and computer readable program code configured to automatically negotiate with an agent of the mobile device to accord access to at least one of the defined zones, via: assessing at least one security constraint relative to the mobile device; and thereupon designating at least one zone to be accessible to the mobile device.

An additional aspect of the invention provides a method comprising: detecting the presence of a mobile device relative to an enterprise network; and automatically negotiating with an agent of the mobile device to accord access to at least one defined zone associated with one or more resources of the enterprise network, wherein the at least one defined zone comprises a plurality of zones defined by security level and with respect to accessibility of at least one resource of the enterprise network; the negotiating comprising: assigning the mobile device to a quarantine zone; examining the mobile device for policy compliance; assessing at least one security constraint of the mobile device; and thereupon designating at least one zone to be accessible to the mobile device; and assigning one or more credentials to the mobile device subsequent to the negotiating, wherein the one or more credentials are employable in according future access of the mobile device to one or more of the defined zones.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
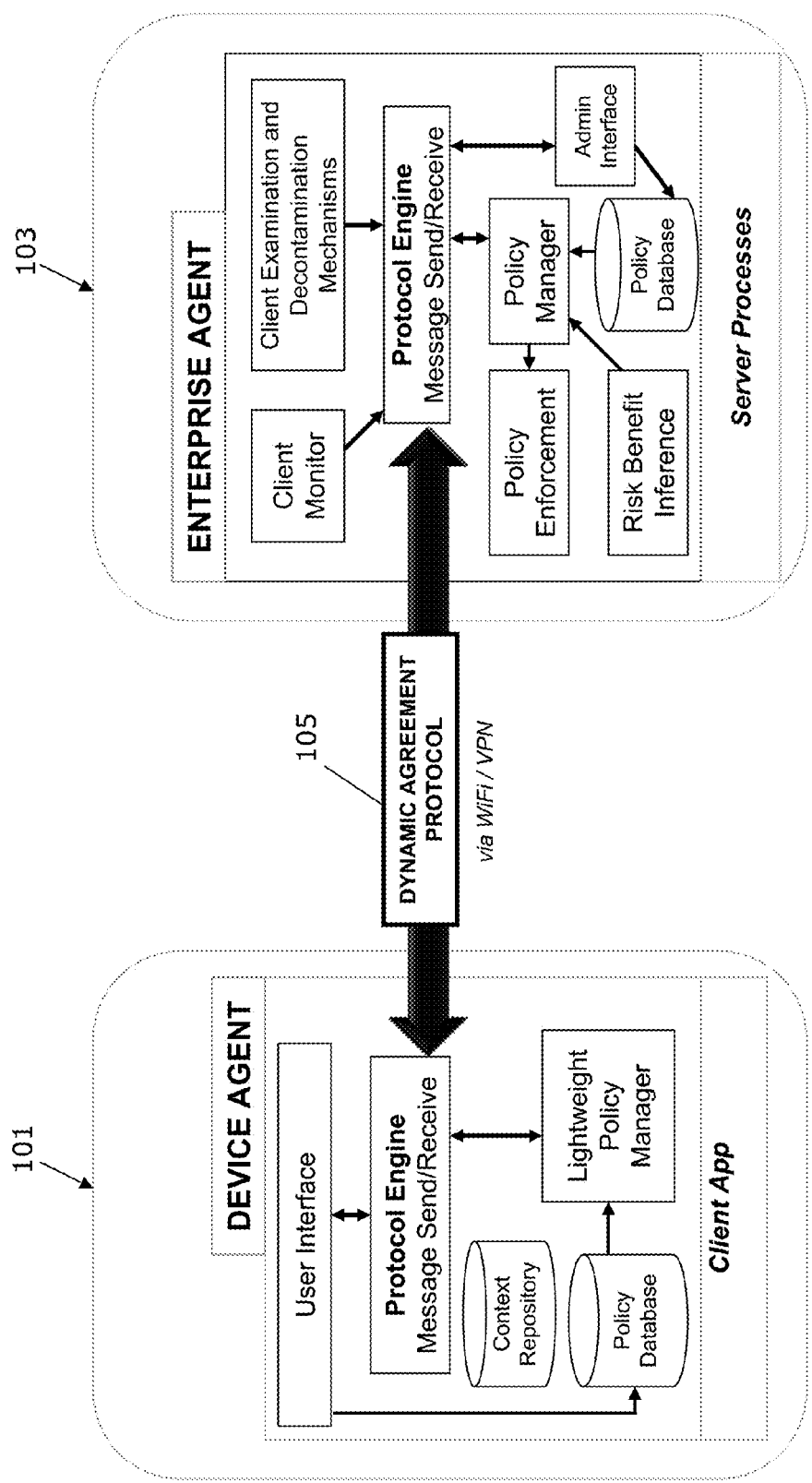
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which securely associate an external mobile device with an enterprise network, while configuring suitable privileges subject to the security and privacy constraints of both the enterprise and the mobile device. An enterprise can build multiple access boundaries, or perimeters, around it; these may include monotonically varying security levels. Enterprise resources can be categorized and ordered based on value and security vulnerability, and assigned to suitable perimeters. Security policies can be created to guard resources, based on resource categorization, the nature of perimeters, and user configurations. Additionally, an enterprise agent can run in a trusted context and conduct a negotiation protocol or agreement with an external mobile device to decide the perimeter in which to place (or with which to associate) a device.

Moreover, in accordance with at least one embodiment of the invention, there are broadly contemplated herein methods and arrangements in which an external mobile device seeking association with an enterprise runs a trusted device agent that negotiates with the enterprise and manages user privacy policies intended to guard private data and applications on the device. As such, the enterprise agent can place a supplicant device within quarantine, or prohibit access with any enterprise entity other than itself, until the negotiation protocol concludes. The enterprise agent can examine the device for policy compliance, optionally taking into account a list of service requests posed by the supplicant device. Further, the enterprise agent can take, or requests the device to take, remediation actions to bring it to a state of policy compliance that is necessary for the device to get its desired level of service access. Also, the enterprise agent can determine a perimeter in which to place (or with which to associate) the device, or can keep it out of the enterprise, depending on the level of compliance and remediation actions carried out by the device.

Furthermore, in accordance with at least one embodiment of the invention, there are broadly contemplated herein methods and arrangements in which an enterprise agent secures enterprise resources by assigning appropriate credentials to the supplicant device after conclusion of a negotiation protocol. The enterprise agent can update access control lists, assign capabilities and certificates, and deploy suitable security controls at strategic locations to regulate information flows as per enterprise policy and as per the nature of the agreement reached with the supplicant device.

The features discussed above, and others, relating to at least one embodiment of the invention, will be better appreciated from the discussion which follows.

As generally understood herein, in accordance with at least one embodiment of the invention, "mobile devices" can encompass essentially any type of mobile computing or telephonic devices such as mobile phones, smartphones, personal digital assistants and laptop or tablet computers.

It will be appreciated herein, in accordance with at least one embodiment of the invention, and in a manner to be better understood herebelow, that enterprises, with private data, services and resources to protect, may run a boundary monitor module in a trusted context that determines perimeters and their security levels, and manages access control policies. It will further be appreciated that mobile devices may run applications ("apps") that can manage user policies and are capable of negotiating with enterprise boundary monitors.

In accordance with at least one embodiment of the invention, there are broadly contemplated herein methods and arrangements for implementing an automated policy-compliant procedure for controlling access of external mobile devices to enterprise resources. In this manner, an enterprise can determine multiple boundaries or access levels of monotonically varying stringency based on the set of resources and data being guarded. There can be implemented a negotiation protocol guided by the policies of the enterprise and external devices alike to determine an optimal boundary or access level for a device.

Generally, in a context of at least one embodiment of the invention, it is understood that enterprises may have a need to support "BYOD (Bring Your Own Device)" capabilities for employees and non-employees alike. Interoperability of external mobile devices with an enterprise network can enhance productivity and collaboration, in accordance with different roles within the enterprise (e.g., manager, admin, consultant, etc.). However, this can pose serious security threats to enterprise networks. For instance, employees may bring in vulnerable or infected devices, or their devices may be running insecure or compromised applications ("apps"). Users, as well, have legitimate privacy concerns; for instance, not all users are employees, and private devices may contain private user data governed by a user's privacy concerns.

Conventional solutions have done little to adequately address problems as noted above. Manual inspection and/or device reconfiguration can be cumbersome, time-consuming and unreliable. Other automated enterprise protection systems have proven to be inefficient and inflexible, wherein the dynamism and complexity of enterprises in general is not usually taken into account. For instance, not all mobile devices necessarily need to gain or enjoy full enterprise access.

In accordance with at least one embodiment of the invention, there are broadly contemplated herein solutions that more adequately take into account various factors such as the nature of a perceived threat from a device, and a user's identity or role within an enterprise. Multiple security boundaries with varying levels of access can be employed, and users can decide a level of control to permit the enterprise to assume over their devices (e.g., in exchange for a given degree of enterprise access). Device context may also be taken into account (e.g., as to whether a device is in the vicinity of the enterprise or connecting through a remote connection).

In accordance with at least one embodiment of the invention, it can be recognized that an enterprise and its network may possess tangible resources (e.g., printers, projectors or other hardware), services (e.g., web or cloud services) and private data (e.g., files or databases) that can be accessed only by members or other authorized entities; as noted before, any and all of these (tangible resources, services and private data) can be considered general "resources" as broadly understood herein. An enterprise may only have a single point of entry, owing to typical gateways and firewalls. Policies and priorities of the enterprise may impact, e.g., whether resources are more or less sensitive, or whether access has localized or wider ramifications.

In accordance with at least one embodiment of the invention, it can also be recognized that resource vulnerability to loss or attack can be modeled quantitatively (e.g., via risk/benefit models or partial orderings). Further, it can be recognized that mobile devices may act in an autonomous manner, e.g., via their running applications of varying trustworthiness (which itself may be modeled or inferred), via containing private data to be protected from snooping, and/or via having explicit policies and priorities of their own accord.

In accordance with at least one embodiment of the invention, enterprise boundary levels are built and dynamically adjusted with varying bars for access control criteria. Procedures can be implemented relative to mobile devices desiring entry into enterprise in a secure and risk-averse manner, and the security state of guest mobile devices can be dynamically adjusted based on context changes.

Generally, in accordance with at least one embodiment of the invention, enterprise boundaries are implemented to protect enterprise networks or domains in a customized manner. To this end, enterprise resources may be surveyed and categorized, recognizing that some may require greater protection than others (e.g., printer access can be offered to guests, but not data server access). A partial ordering of resources can be built, based on desired protection levels, e.g., via employing risk/benefit models.

In accordance with at least one embodiment of the invention, security policies can be developed relative to resources, subjects, and context. To this end, role- and context-based access control models can be employed. As such, multiple enterprise access units, or boundaries, can be developed; these can vary over any conceivable spectrum, e.g., from full access to no access.

In accordance with at least one embodiment of the invention, a device entry procedure can involve a dynamic determination of a boundary or access level to be assigned to an external mobile device that is requesting entry (or access). Trusted agents of the enterprise (EA) and on the device (DA) can mediate this entry procedure. In both cases the agent may be embodied by an arrangement for executing code configured to carry out steps involved in the entry procedure; on the device, the agent may be embodied by an installed application or even by another suitable utility initially present in the device.

In accordance with at least one embodiment of the invention, three sequential stages of protocol are traversed by the device. These include: quarantine, where the device is kept in isolation and has contact only with EA; examination, where the EA verifies whether the device is complying with enterprise policy, via communicating with DA; and decontamination, where the EA enforces policy, or guides remediation, on the device. In the examination step, the DA may optionally disclose a list of desired services prior to examination (e.g., access to printers and conference room projectors, access to the Internet, etc.) and the EA may optionally request the device for permission to determine its security state (e.g., through probe modules to gather device info) or determine that state by itself (e.g., through a network port scan), while in decontamination, remediative or corrective actions are undertaken per one or more EA policies (e.g., patching software, anti-virus software, firewalls).

In accordance with at least one embodiment of the invention, a policy compliance level determines the boundary or access level assigned to a device. For instance, some devices may be given complete access and others given minimal access. The DA permits users to express privacy policies that are to be resolved with the enterprise's policies (maintained by EA) during the course of this protocol. For instance, a device may choose not to run probe modules mandated by the enterprise, or to run with restricted access. For its part, the EA monitors and probes mobile devices for policy compliance; this may take place periodically, if the DA requests additional privileges, or if the security state (risk perception) changes. Policy violators may be sent back into quarantine and be prompted to re-negotiate entry, or may be pushed to a less stringent security level.

In accordance with at least one embodiment of the invention, automated negotiation between a device and enterprise involves work towards compromise; this alleviates situations where both parties include different sets of policies that are not known to each other. Automated negotiation also takes into account dynamically changing goals and policies and can thus account for them on an ongoing basis. To this end, additional vocabulary can be provided to support negotiating functions, such as: pluggable side operations, including the verification of system security state, installing patches and security controls; obligations (e.g., a device may not be able to run vulnerable software, or to delete or disable an MDM agent/control installed by the enterprise); reasoning about risks, benefits, and trust levels; and credential operations, including delegation and revocations. Thus, any or all of these items may assist in allowing an enterprise agent to be in a better position to detect the suitability of one or more mobile devices for assignment to one or more given enterprise zones (or security levels). Also, automatic negotiation can provide for an automatic determination of alternatives, based on more than just estimated security levels associated with enterprise resources, and provably satisfies logic and security properties. In other words, should one or more enterprise resources not be explicitly associated, to start, with one or more enterprise zones or security levels, the enterprise agent may dynamically determine the suitability of one or more resources to be accessed by a mobile device, based on a calculation of one or more determining factors that may reasonably point to the suitability of a mobile device to be assigned to one or more enterprise zones (or security levels).

In accordance with at least one embodiment of the invention, the EA configures suitable mechanisms to enable joined devices to access services. Authorization mechanisms may include ACLs and capabilities, as well as certificates. Security controls may be deployed based on information flow modeling. To this end, information flows (IF) may be enumerated at all ingress and egress points, IF-authorization policies may be framed for both parties, and the EA may determine the nature and location of security controls.

In view of the foregoing, FIG. 1 schematically illustrates a system architecture in accordance with at least one embodiment of the invention, relative to an end user device 101 (with an associated DA) and an enterprise network 103 (with an associated EA). As shown, protocol engines belonging to the DA and EA, respectively, are able to communicate back and forth with each other (e.g., via WiFi or VPN) in accordance with a dynamic agreement protocol as discussed heretofore. The client application may be downloaded from an "app store" or elsewhere, and may employ storage and other functional mechanisms within the end user device 101 as needed. Such mechanisms can include (but need not be limited to) a user interface, context repository, protocol engine, policy database and lightweight policy manager. Server processes may be run on a gateway of the enterprise network. The architecture shown in FIG. 1 is provided merely by way of illustrative and non-restrictive example and is simply representative of a very wide variety of possible architectures that may be employed.

Figure 2:
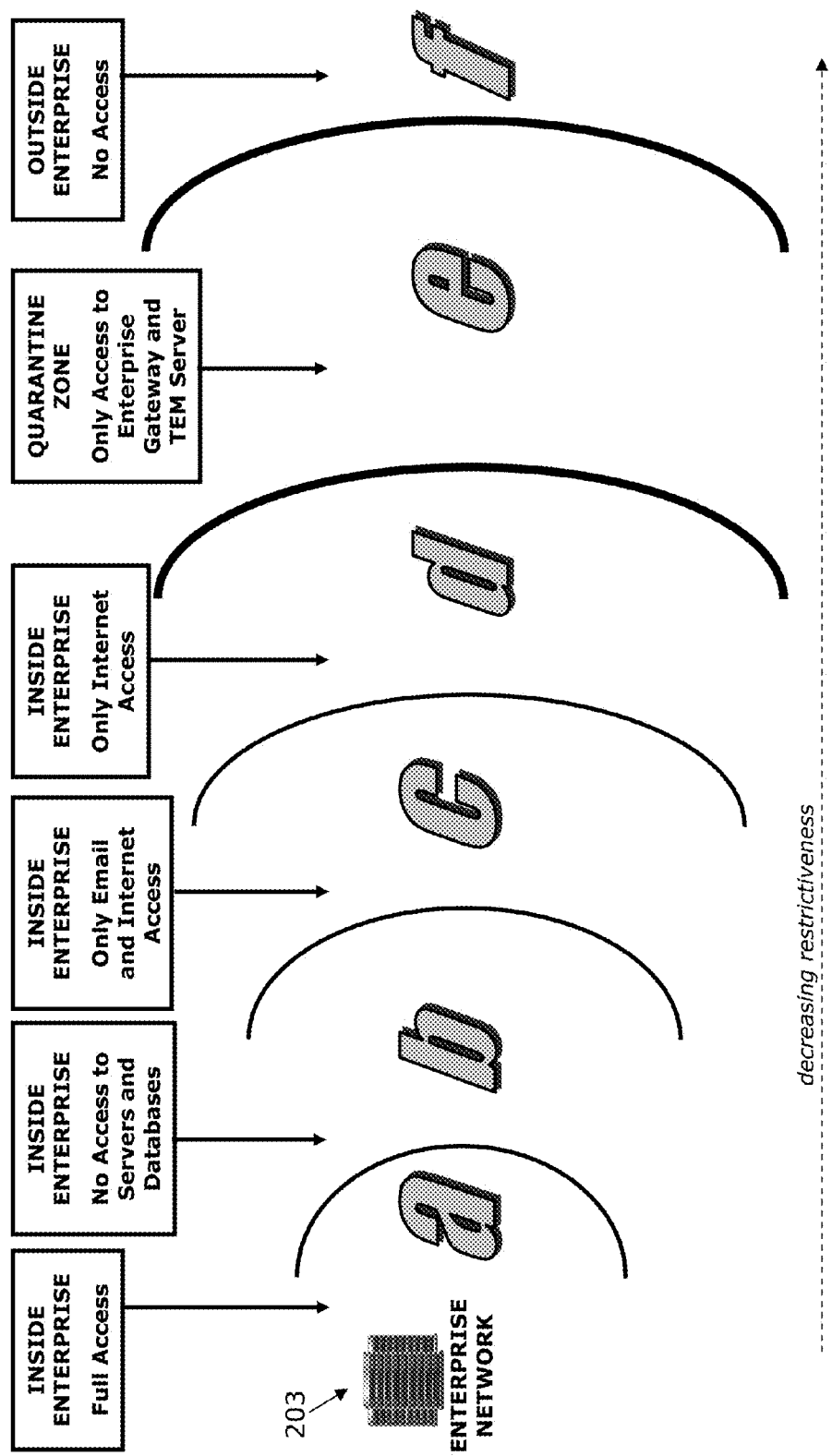
FIG. 2 schematically illustrates a set of enterprise network access perimeters.

In accordance with at least one embodiment of the invention, as shown in FIG. 2, a variety of access levels (or perimeters or zones) may be imposed by an enterprise network 203. These can include those labeled by the larger letters a-f, in order of decreasing restrictiveness (from left to right). Thus, in accordance with the present example, zone a offers full access to the enterprise, zone b offers no access to servers and databases (inside the enterprise), zone c offers only email and Internet access and zone d offers only internet access. Zone f offers no access to the enterprise, and access is thus only gained by entering a quarantine zone e as discussed heretofore. By way of negotiation or standing permissions, an item such as an employee's work tablet could gain access to perimeter d. The capability of other devices to gain any access to any of the zones a-d can be obtained via negotiation as discussed heretofore (let alone, of a device such as an employee's work tablet to gain access to any of zones a-c).

It should be understood and appreciated, in accordance with at least one embodiment of the invention, that inasmuch as the discussion herein has focused at least to some extent on mobile phones and smartphones as an operating context, it should be understood and appreciated that solutions as broadly contemplated herein may be employed on other devices such as laptop and tablet computers. Any of these mobile devices may run applications ("apps") that can manage user policies and are capable of negotiating with enterprise boundary monitors.

In accordance with at least one embodiment of the invention, very generally, quantitative values as determined herein, or other data or information as used or created herein, can be stored in memory or displayed to a user on a screen, as might fit the needs of one or more users.

Figure 3:
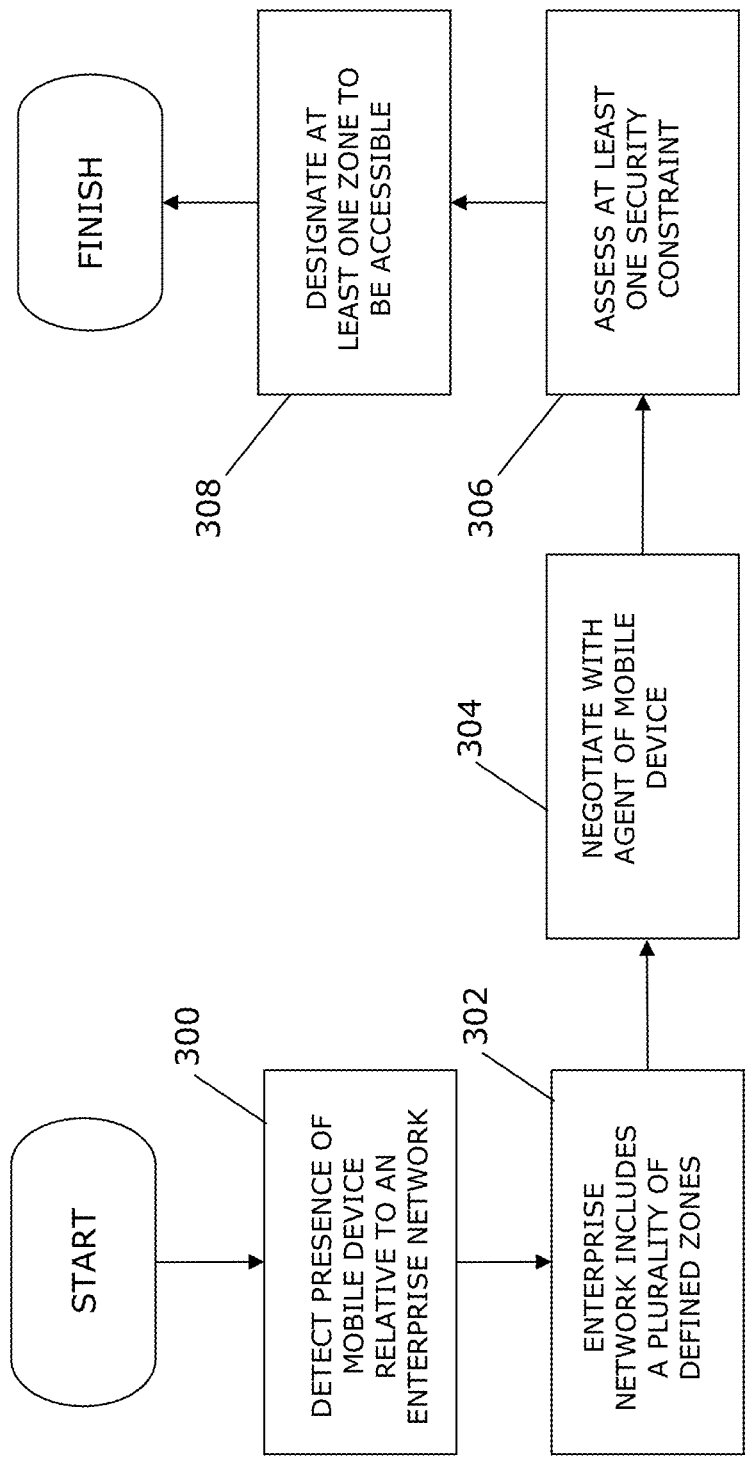
FIG. 3 sets forth a process more generally for according access of a mobile device to an enterprise network

FIG. 3 sets forth a process more generally according access of a mobile device to an enterprise network, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, the presence of a mobile device relative to an enterprise network is detected (300), the enterprise network including a plurality of defined zones, wherein each zone is associated with a security level and with one or more resources (302). An agent of the mobile device is negotiated with to accord access to at least one of the defined zones (304). The negotiating includes: assessing at least one security constraint relative to the mobile device (306); and thereupon designating at least one zone to be accessible to the mobile device (308).

Figure 4:
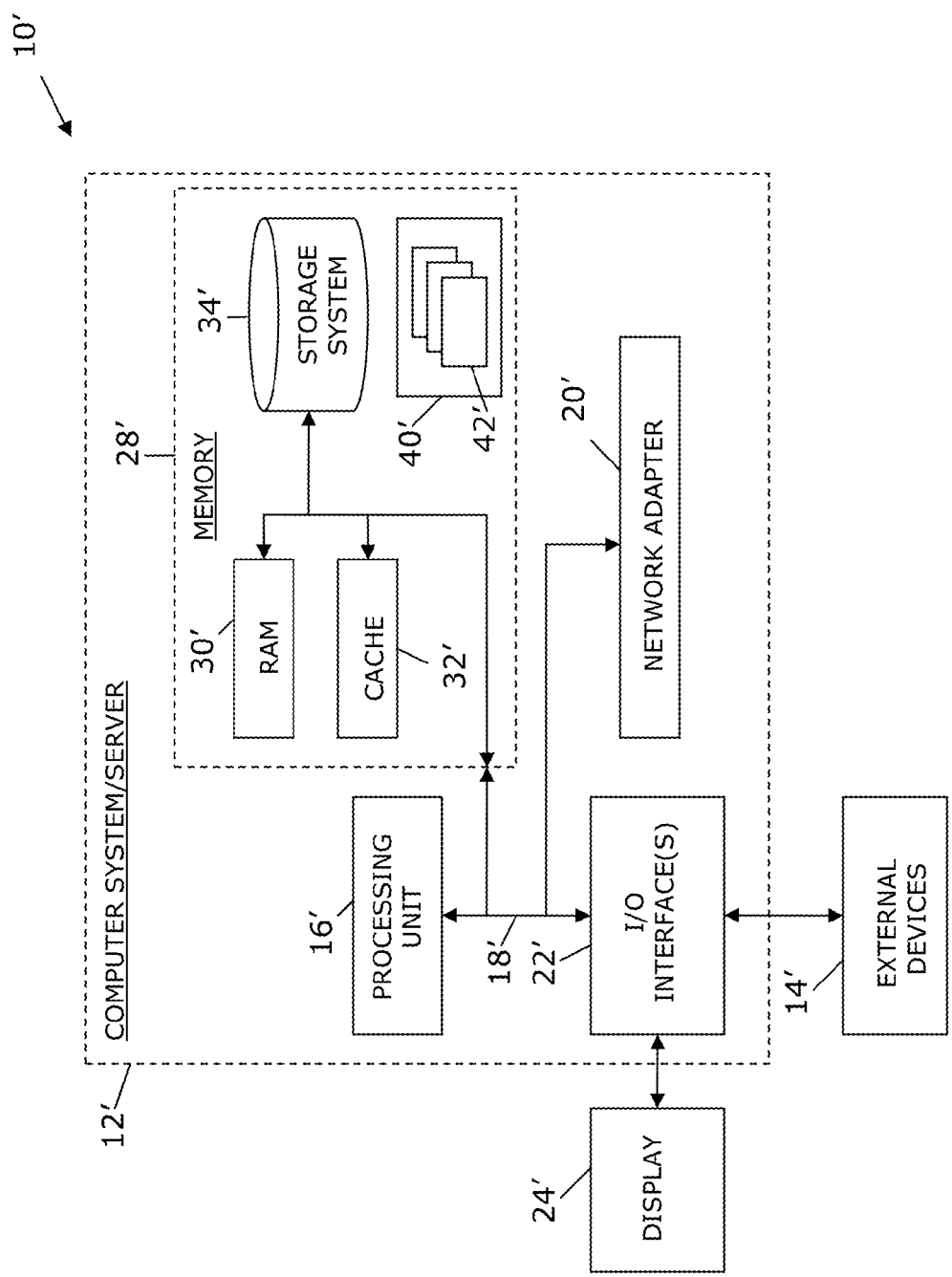
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting the presence of a mobile device relative to an enterprise network; and
   automatically negotiating with an agent of the mobile device to accord access to at least one defined zone associated with one or more resources of the enterprise network, wherein the at least one defined zone comprises a plurality of zones defined by security level and with respect to accessibility of at least one resource of the enterprise network;
   said negotiating comprising:
     assigning the mobile device to a quarantine zone;
     examining the mobile device for policy compliance;
     assessing at least one security constraint of the mobile device; and
     thereupon designating at least one zone to be accessible to the mobile device; and
   assigning one or more credentials to the mobile device subsequent to said negotiating, wherein the one or more credentials are employable in according future access of the mobile device to one or more of the defined zones.

2. The method according to claim 1, wherein the at least one security constraint comprises at least one policy associated with the mobile device.

3. The method according to claim 1, wherein the at least one security constraint comprises at least one policy associated with the enterprise network.

4. The method according to claim 1, wherein said negotiating comprises inputting from the mobile device a list comprising one or more service requests.

5. The method according to claim 1, comprising issuing a request to the mobile device for remediation action in response to examining the mobile device for policy compliance and detecting at least one item of non-compliance.

6. The method according to claim 5, comprising according access to at least one defined zone in response to a notification of successful remediation action from the mobile device.

7. The method according to claim 1, wherein said negotiating comprises detecting at least one change associated with the mobile device and re-negotiating at least one credential associated with the mobile device.

8. The method according to claim 7, wherein the at least one change comprises one or more of: a state of the mobile device, and a resource requirement of the mobile device.

9. The method according to claim 1, wherein said negotiating comprises dynamically determining the suitability of one or more enterprise resources to be accessed by the mobile device.

10. An apparatus for according access of a mobile device to an enterprise network, said apparatus comprising:
    at least one processor; and
    a non-transitory computer readable storage medium having computer readable program code embodied therewith and executable by the at least one processor, the computer readable program code comprising:
    computer readable program code configured to detect the presence of a mobile device relative to the enterprise network;
    computer readable program code configured to automatically negotiate with an agent of the mobile device to accord access to at least one defined zone associated with one or more resources of the enterprise network, wherein the at least one defined zone comprises a plurality of zones defined by security level and with respect to accessibility of at least one resource of the enterprise network;

the negotiating comprising:
   assigning the mobile device to a quarantine zone;
   examining the mobile device for policy compliance;
   assessing at least one security constraint relative to the mobile device; and
   thereupon designating at least one zone to be accessible to the mobile device; and
assigning one or more credentials to the mobile device subsequent to the negotiating, wherein the one or more credentials are employable in according future access of the mobile device to one or more of the defined zones.

11. A computer program product for according access of a mobile device to an enterprise network, said computer program product comprising:
   a non-transitory computer readable storage medium having computer readable program code embodied therewith, the computer readable program code comprising:
   computer readable program code configured to detect the presence of a mobile device relative to the enterprise network;
   computer readable program code configured to automatically negotiate with an agent of the mobile device to accord access to at least one defined zone associated with one or more resources of the enterprise network, wherein the at least one defined zone comprises a plurality of zones defined by security level and with respect to accessibility of at least one resource of the enterprise network;
   the negotiating comprising:
      assigning the mobile device to a quarantine zone;
      examining the mobile device for policy compliance;
      assessing at least one security constraint relative to the mobile device; and
      thereupon designating at least one zone to be accessible to the mobile device; and
   assigning one or more credentials to the mobile device subsequent to the negotiating, wherein the one or more credentials are employable in according future access of the mobile device to one or more of the defined zones.

12. The computer program product according to claim 11, wherein the at least one security constraint comprises at least one policy associated with the mobile device.

13. The computer program product according to claim 11, wherein the at least one security constraint comprises at least one policy associated with the enterprise network.

* * * * *